(12) United States Patent  
Murphy

(10) Patent No.: US 7,844,475 B1  
(45) Date of Patent: Nov. 30, 2010

(54) METHOD FOR STRATEGIC COMMODITY MANAGEMENT THROUGH MASS CUSTOMIZATION

(75) Inventor: Gerald B. Murphy, Indianola, IA (US)

(73) Assignee: Makar Enterprises, Inc., Indianola, IA (US)

( * ) Notice: Subject to any disclaimer, the term of this patent is extended or adjusted under 35 U.S.C. 154(b) by 2510 days.

(21) Appl. No.: 09/777,761

(22) Filed: Feb. 6, 2001

(51) Int. Cl.
*G06Q 40/00* (2006.01)

(52) U.S. Cl. ............... 705/4; 705/7; 705/10; 705/35; 705/38; 434/322

(58) Field of Classification Search .............. 705/4, 705/7, 10, 35, 38; 434/322
See application file for complete search history.

(56) References Cited

U.S. PATENT DOCUMENTS

| | | | |
|---|---|---|---|
| 5,897,619 A * | 4/1999 | Hargrove et al. ............... | 705/4 |
| 6,185,543 B1 * | 2/2001 | Galperin et al. ............... | 705/38 |
| 6,990,459 B2 * | 1/2006 | Schneider ...................... | 705/8 |
| 2001/0027437 A1 * | 10/2001 | Turbeville et al. .............. | 705/38 |
| 2001/0049651 A1 * | 12/2001 | Selleck ......................... | 705/37 |
| 2002/0019793 A1 * | 2/2002 | Frattalone .................... | 705/36 |
| 2002/0023052 A1 * | 2/2002 | Remley et al. ................ | 705/38 |
| 2002/0059091 A1 * | 5/2002 | Hay et al. ..................... | 705/8 |
| 2002/0065753 A1 * | 5/2002 | Schloss et al. ................ | 705/35 |
| 2002/0069156 A1 * | 6/2002 | Adam et al. ................... | 705/37 |
| 2002/0082982 A1 * | 6/2002 | Mock et al. .................... | 705/37 |
| 2002/0103688 A1 * | 8/2002 | Schneider ...................... | 705/8 |
| 2002/0120555 A1 * | 8/2002 | Lerner ........................... | 705/37 |
| 2002/0123960 A1 * | 9/2002 | Ericksen ....................... | 705/38 |

OTHER PUBLICATIONS

Friedman, J. "Dictionary of Business Terms," 2000, Barron's Business Guides, 3rd Edition, pp. 757-758.*
DeVuyst, E. "Farm Managment Software and Risk: A Review," Dec. 31, 1995, Journal of the ASFMRA, p. 174-179.*
Miranda, M. "AgRisk 1.0 Technical Reference," Aug. 31, 2000.*
"Optimal Grain Marketing: Balancing Risks and Revenue," National Grain and Feed Foundation, 1999.*
O'Brien, D. M., "Grain Marketing Plans for Farmers," Kansas State University Agricultural Experiment Station and Cooperative Extension Service, Jul. 2000.*
Gullo, K. "Mellon Adds Credit-Score System Aims to Cut Business-Loan Risk with New Software Series: 8," Mar. 7, 1990, American Banker, p. 3.*
Hurt, C. "Are your Farmers Confused About Marketing?" Journal of Extension, Winter 1986, vol. 24, No. 4.*

(Continued)

*Primary Examiner*—Joseph Thomas
*Assistant Examiner*—Lena Najarian
(74) *Attorney, Agent, or Firm*—McKee, Voorhees & Sease, P.L.C.

(57) ABSTRACT

The present invention includes a new system and method for the construction of agricultural marketing plans for agricultural producers. The present invention further includes a system and method for mass customization and delivery of the plans to producers and other interested parties, including electronic delivery of the plans and associated marketing information on an individualized basis. One aspect of the present invention involves calculating an optimized crop insurance revenue plan. Another aspect of the present invention relates to the quantification of price risk and the quantification of financial risk and the combination of these different types of risks to determine an overall risk for an agricultural operation.

14 Claims, 8 Drawing Sheets

OTHER PUBLICATIONS

Goreham, G. A., "Questions and Answers about Agriculture Loan Officers and Farmers' Investments in New Generation Cooperatives," Mar. 1998. North Dakota State University.*

"Summary: Farmer Cooperatives 2000 Conference" Dec. 14 and 15, 2000. Las Vegas, Nevada. University of Wisconsin Center for Cooperatives.*

Jose, H. D. and Valluru, R. S. K., "Insights from the Crop Insurance Reform Act of 1994," 1997, Agribusiness, vol. 13, No. 6, 587-598.*

U.S. Appl. No. 60/226,857.*

Publication: "Crop Revenue Profiler Software Program" Information—Oct. 26, 2000.

Press Release: "The Andersons, Inc. Licenses Software to American Agrisurance"—Oct. 24, 2000.

"Brock Associates: Commodity Marketing and Hedging Advice" www.brockereport.com/brockreport/2/13/2006 2 pages.

"Brock Associates: Commodity Marketing and Hedging Advice" www.brockreport.com/brockreport/MIA_Promo.asp2/13/2006 2 pages.

* cited by examiner

| | | | COVERAGE LEVEL COSTS |
|---|---|---|---|
| CROP CHOICE [ ] | CRC OR RA | | |
| | CRC | 65% | [ ] |
| | CRC | 70% | [ ] |
| LOAN AMOUNT [ ] | CRC | 75% | [ ] |
| TOTAL ACRES [ ] | | 80% | [ ] |
| REQUESTED LOAN PER ACRE [ ] | RA | 85% | [ ] |
| INTEREST RATE [ ] | | | |

MARKET FACTORS

AVG. FUTURE PRICE TO PRE-SELL [ ]
PROBABILITY OF REACHING PRICE [ ]
EXPECTED CASH BASIS [ ]
EXPECTED FALL FUTURE PRICE [ ]
PROBABILITY OF REACHING PRICE [ ]
EXPECTED FALL CASH BASIS [ ]

YIELD AND PRICES

APH [ ]
EXPECTED SPRING PRICE [ ]
EXPECTED HARVEST PRICE [ ]

ANTICIPATED PRE-SELL BU. [ ]
OR
ANTICIPATED PRE-SELL (%) [ ]

COST OF CALL ON PRE-SOLD PER BUS [ ]

COST OF CALL ON UNSOLD PER BUS [ ]   FREEDOM TO FARM/ACRE [ ]

COST OF PUT ON PRE-SOLD PER BUS [ ]   ACTUAL HARVEST YIELD [ ]

COST OF PUT ON UNSOLD PER BUS [ ]   UNDERWRITING CALLS ALLOWED? (IF YES, MUST STATE YES;IF NO, STATE NO) [ ]

LDP VALUE ON PRE-SOLD BUS [ ]   UNDERWRITING PUTS ALLOWED? (IF YES, MUST STATE YES;IF NO, STATE NO) [ ]

MIN. PRICE FOR UNSOLD HARVEST [ ]   COUNTY "LOAN" PRICE [ ]

Fig. 4

CROP INSURANCE / MARKETING WORKSHEET

_____ APH X __65%__ LEVEL OF COVERAGE = _____ GUARANTEE YIELD

_____ GUARANTEE YIELD X _____ BASE SPRING PRICE LEVEL = _____ MINIMUM GUARANTEE REVENUE PER ACRE

_____ GUARANTEE YIELD X _____ HARVEST PRICE LEVEL = _____ HARVEST GUARANTEE PER ACRE (THE LARGER REVENUE BETWEEN MINIMUM GUARANTEE REVENUE AND HARVEST GUARANTEE) _____ FINAL GUARANTEED REVENUE

_____ FINAL GUARANTEED REVENUE / _____ HARVEST PRICE LEVEL = _____ FINAL GUARANTEED YIELD

"INSURED" PRE-SOLD GRAIN AT NET CASH PRICES:
_____ BUSHELS/ACRE X _____ PRICE/BUSHEL = _____

NET COST OF CALL ON PRE-SOLD GRAIN AND UNSOLD GRAIN:
_____ BUSHELS/ACRE X _____ COST OF CALL/BUSHEL = _____

NET COST OF PUT ON PRE-SOLD GRAIN AND UNSOLD GRAIN:
_____ BUSHELS/ACRE X _____ COST OF PUT/BUSHEL = _____

LDP VALUE/BUSHEL ON INSURED PRE-SOLD GRAIN:
_____ BUSHELS/ACRE X _____ PRICE/BUSHEL = _____

LOAN PRICE OR MINIMUM PRICE OF UNSOLD GRAIN:
_____ BUSHELS/ACRE X _____ SEAL PRICE/BUSHEL = _____

PROFIT ON CALLS OF PRE-SOLD GRAIN AND UNSOLD GRAIN:
_____ BUSHELS/ACRE X _____ PRICE/BUSHEL = _____

PROFIT ON PUTS OF PRE-SOLD GRAIN AND UNSOLD GRAIN:
_____ BUSHELS/ACRE X _____ PRICE/BUSHEL = _____

FREEDOM TO FARM PAYMENTS (478 B FORM)
_____ TOTAL FREEDOM TO FARM PAYMENT / _____ TOTAL TILLABLE ACRES = _____

(CORN BASE ACRES X BASE YIELD X .85 X BASE PRICE)
INDEMNITY
_____ FINAL GUARANTEE YIELD − _____ ACTUAL YIELD/ACRE = _____

_____ INDEMNITY BUSHELS X _____ HARVEST PRICE = _____

GROSS RETURN/ACRE _____

*Fig. 5*

| ASSUMPTIONS: | | CROP: | | 0 | |
|---|---|---|---|---|---|
| LOAN AMOUNT PER ACRE | | CASH HARVEST PRICE/BU | | 65% | |
| ACTUAL PRODUCTION HISTORY (APH) | | MINIMUM OR "LOAN" PRICE/BU | | 70% | |
| EXPECTED SPRING PRICE/BU | | LDP VALUE PER BU | | 75% | |
| EXPECTED HARVEST PRICE/BU | | GOV PAYMENT (PER ACRE) | | 80% | |
| ACTUAL HARVEST YIELD/ACRE | | PRIMARY PURPOSE: | | 85% | |
| CASH PRE-SELL PRICE/BU | | YES LOAN REQUEST PER ACRE | | | |
| | | YES MAXIMIZE REVENUE POTENTIAL | | | |

| | PLAN 65% | PLAN 70% | PLAN 75% | PLAN 80% | PLAN 85% |
|---|---|---|---|---|---|
| LEVEL OF COVERAGE | CRC | CRC | CRC | CRC | RA |
| KIND OF COVERAGE | | | | | |
| SPRING GTD YIELD (BUS) | | | | | |
| SPRING MIN GTD | | | | | |
| HARVEST MAX GTD | | | | | |
| FINAL GTD $ | | | | | |
| FINAL GTD YIELD (BUS) | | | | | |
| INDEMNITY BUSHELS | | | | | |
| INDEMNITY VALUE | | | | | |
| BENEFIT/COST STATUS (OVER PREVIOUS) | | | | | |
| BUSHELS PRE-SOLD | | | | | |
| INSURED BUS. TO PRE-SELL | | | | | |
| UN-INSURED BUS. TO PRE-SELL | | | | | |
| INSURED BUS. NOT SOLD | | | | | |
| CASH SALES | | | | | |
| EXPECTED GAIN ON FUTURES | | | | | |
| PROJECTED COSTS ON FUTURES | | | | | |
| NET MARKET PLAN REVENUE | | | | | |
| PER BUSHEL PRICE | | | | | |
| "NO PLAN" REVENUE | | | | | |
| PER BUSHEL PRICE | | | | | |
| AVAIL ASSURED INCOME FOR LOAN | | | | | |
| LOAN REQUEST PER ACRE | | | | | |
| VARIANCE | | | | | |

SUGGESTED "BEST CASE" CROP REVENUE PLAN:

Fig. 6

METHOD FOR STRATEGIC COMMODITY MANAGEMENT THROUGH MASS CUSTOMIZATION

BACKGROUND OF THE INVENTION

1. Field of the Invention

This invention relates to the field of agricultural management and marketing. More particularly, though not exclusively, this invention is drawn to a method and system of marketing for agricultural producers and for providing marketing services to agricultural producers and those interested in the management of agricultural producers.

2. Problems in the Art

Despite the size and importance of the agriculture economy, the farmer has not been able to sell his/her products for a profit. This inability for farmers to sell their products for profit has had numerous effects on the agriculture industry and the economy.

The effects have included that farms are growing in size. Another effect is that vertical integration has occurred, consolidating agricultural production with downstream processes such as meatpacking. In remaining farm families, one or more members of the family often work outside the farm in order to produce steady income. Additional pressures have fallen on the producers as government's role in agriculture declines, reducing or eliminating subsidies, price controls, and other measures that sometimes benefit agricultural producers. Government involvement and available farm programs has also added to the complexity of production and financial decisions.

Another problem for producers involves the availability of tools such as crop insurance or financing. Crop insurance can provide some protection against loss of crops, so in some respects can be tied to revenue, but there are many limitations on crop insurance, as a successful season is no longer a mere function of the weather. Furthermore, crop insurance such as crop revenue coverage (CRC) provides only revenue protection on a crop-by-crop basis.

The availability of financing and financing terms are other problems that plague the agricultural producer. Banks, farmer cooperatives, and other lenders are often unwilling to loan money to farmers or producers or otherwise extend credit. When lending institutions do extend credit, the financing terms themselves reflect the uncertainty of agricultural operations' propensity for success.

These and many other problems face the producer. The complexity of the agricultural production industry continues to increase, with many uncertainties that result in producers not being able to operate profitably. This uncertainty creates additional problems, as it increases other costs of business, such as financing rates (assuming financing can be even be found), and insurance rates.

Many attempts have been made to solve these and related problems. Due to the number of variables involved, the complexity of the interplay between production and finance, agricultural producers have not been able to solve these problems. Furthermore, banks and other lenders or creditors have not been able to solve these problems either in order to ensure that the agricultural producers debt obligations are made. Thus numerous problems face agricultural producers.

Although particular agricultural producers, financial planners, financial institutions and others have developed their own rules of thumb and calculations to improve the likelihood of success, there have been problems with these implementations. In particular, such prior art solutions are not comprehensive in nature and cannot be applied consistently to a number of operations in order to obtain consistent results.

In fact, producers have used a number of ad hoc methods of market prediction with unpredictable and often poor results. Producers have a tendency to seek out the high market price and to sell at this price. This "high price" is not predictable, however, and there is little likelihood of a producer being able to predict it. This prediction is normally made by a producer on hearsay information, incomplete market data, and other guesses or estimates. A producer's guess as to what the high price is and when it occurs is troublesome, as the producer is taking a very large gamble on what that price will be and when it will occur. Lenders and creditors are also very uncomfortable with this situation as it is not in their best interest to have the producer gamble away his or her ability to meet debt obligations. At the same time, however, lenders such as financial institutions are not in a position to predict markets either and have no greater expertise than a particular agricultural producer.

It is therefore a primary objective, feature, or advantage of the present invention to provide an apparatus, method, and system which improve upon the state of the art.

It is another objective, feature, or advantage of the present invention to provide for a method of creating marketing plans for agricultural producers.

It is another objective, feature, or advantage of the present invention to provide a method of providing mass customization of marketing plans for agricultural producers.

It is another objective, feature, or advantage of the present invention to provide for optimized selection of a crop insurance revenue plan.

It is another objective, feature, or advantage of the present invention to provide a method of insuring a particular revenue level for agricultural producers.

It is another objective, feature, or advantage of the present invention to provide a method of insuring a particular revenue level for an agricultural operation so that a lender may be more secure in financing the agricultural operation.

It is another objective, feature, or advantage of the present invention to provide a method of quantifying financial risks associated with an agricultural enterprise.

It is another objective, feature, or advantage of the present invention to provide a method of quantifying price risks associated with agricultural crops produced by an agricultural enterprise.

It is another objective, feature, or advantage of the present invention to provide for a method of agricultural production management that permits price add on strategies to be used.

It is another objective, feature, or advantage of the present invention to provide a system and method of agricultural management that permits strategies to be modified as market information changes.

It is another primary objective, feature, or advantage of the present invention to provide for agricultural production analysis on an enterprise wide scale.

It is another primary objective, feature, or advantage of the present invention to provide a system and method of agricultural marketing and management that take into account a producer's familiarity with future's trading.

It is another primary objective, feature, or advantage of the present invention to provide a system and method of agricultural marketing and management that provide assurance of a particular level of revenue.

It is another primary objective, feature, or advantage of the present invention to provide a system and method of agricultural marketing and management to provide opportunities to provide revenue in excess of a particular assured level of revenue.

It is another primary objective, feature, or advantage of the present invention to provide a system and method of agricultural marketing and management that take into account human factors and personal risk preferences in designing a strategic agricultural marketing plan.

It is another primary objective, feature, or advantage of the present invention to provide a system and method of agricultural marketing and management that captures income rather than protecting price.

These and other objectives, features, or advantages of the present invention will become apparent from the specification and claims.

SUMMARY OF THE INVENTION

The present invention includes a new system and method for the construction of agricultural marketing plans for agricultural producers. The present invention further includes a system and method for mass customization and delivery of the plans to producers and other interested parties, including electronic delivery of the plans and associated marketing information.

The plan is formed from information elicited from the producer and market information obtained from a marketing service. Based upon this information a plan is formed that is customized to a particular producer. As markets change, the plan may be updated in order to provide any changes in buying and selling strategies for that which has not been pre-sold. This system emphasizes capturing income instead of protecting price, the pre-selling opportunities of the present invention taking advantage of market opportunities.

The plan includes a number of different aspects or components. One aspect of the present invention involves calculating an optimized crop insurance revenue plan. In this aspect of the invention an optimized crop insurance plan including coverage level is determined. The proper selection of the optimized crop insurance revenue plan assures a level of revenue that allows a producer to meet financial obligations but also permits price add-on strategies of the plan to be implemented. The present invention provides for a system where once a particular price is reached, a cash sale is made.

Another aspect of the present invention relates to the quantification of price risk and the quantification of marketing financial risk and the combination of these different types of risks to determine an overall risk for an agricultural operation. This allows for evaluation of these risks in a straightforward fashion, so that producers and lenders can better determine the true risk of an agricultural enterprise due to both financial factors and market factors.

BRIEF DESCRIPTION OF THE DRAWINGS

The present invention is illustrated by way of example and not limitation in the figures of the accompanying drawings, in which like references indicate similar elements and in which:

FIG. 4 is a diagrammatic representation of an input worksheet of a spreadsheet for the crop insurance component of the present invention.

FIG. 5 is a diagrammatic representation of a calculation worksheet of a spreadsheet for the crop insurance component of the present invention.

FIG. 6 is a diagrammatic representation of an output worksheet of a spreadsheet for the crop insurance component of the present invention.

DETAILED DESCRIPTION OF A PREFERRED EMBODIMENT

The present invention will be described as it applies to a preferred embodiment. It is not intended that the present invention be limited to the described embodiment. It is intended that the invention cover all modifications and alternatives which may be included within the spirit and broad scope of the invention.

The invention is a system and method for production planning and for providing marketing services to agricultural producers. Those skilled in the art will recognize that the system and methods disclosed as part of the preferred embodiment can be easily adapted for different types of enterprises and are not limited by the type or types of commodities being marketed. Generally, the description will involve a Midwestern United States agricultural operation that includes a grain operation where the grain is spring planted and fall harvested. Grains include, without limitation, corn, soybeans, oats, wheat, popcorn and other grains. The present invention, however, is not in any way limited by the type of crop (including livestock) or the growing season or the location of the production operation.

Overview of the Method

Figure 1:
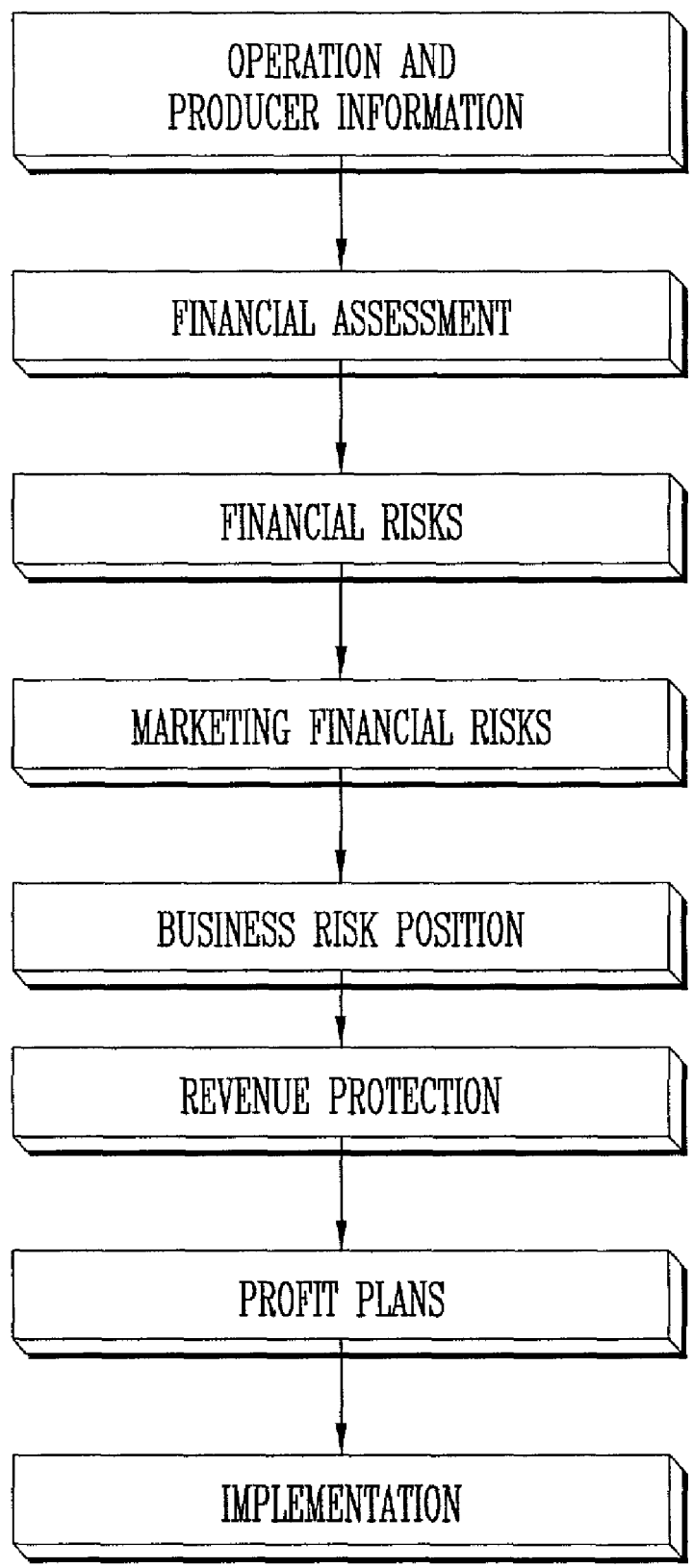
FIG. 1 is a flow chart of an overview of the present invention.

FIG. 1 best shows an overview of the method of constructing a strategic agricultural marketing plan. In step 102, information is elicited concerning an agricultural operation and an agricultural producer. Once this information is obtained, financial assessment is performed in step 104. Next, in step 106, financial risks are quantified. Then marketing financial risks are quantified in step 108. In step 110, marketing financial risks are combined with price risks in order to determine a combined business risk position. Revenue protection analysis is then performed in step 112 and profit planning is conducted in step 114. The plans are then carried out in implementation step 116.

A strategic marketing plan can be constructed for an agricultural producer according to the flow chart of FIG. 1. The construction of a strategic marketing plan according to the present invention involves the elicitation of certain information from the agricultural producer in step 102. This process is shown in greater detail in FIG. 2A.

Figure 2A:
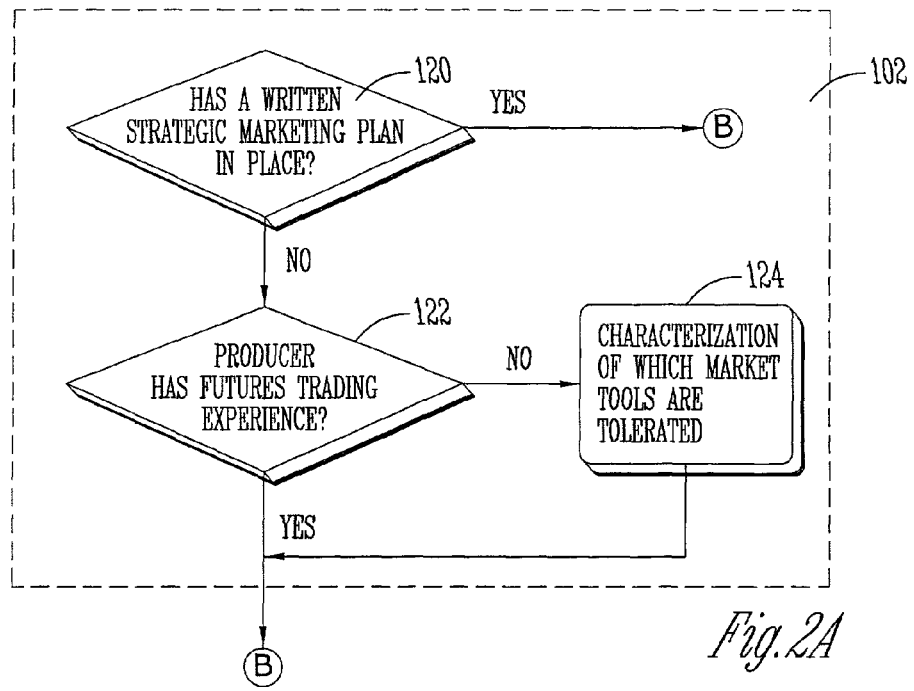
FIG. 2A is a flow chart showing one embodiment of the step of eliciting agricultural operation and producer information.

Referring now to FIG. 2A, in step 120, a determination is made as to whether or not the producer has a written strategic marketing plan. A written strategic marketing plan includes information relevant to production planning and marketing. A marketing plan may contain such information as a mission statement including the direction of the production operation and the marketing tools to be used, written objectives, goals and strategies used in meeting the objectives, identification of external and internal factors that affect the business, clear income objectives to be realized, clear profit objectives including such objectives as total profit, total profit per acre, total profit per enterprise, and financial risk identified.

If the producer does have a strategic marketing plan, and the plan contains the required information, then the step 102 of eliciting operation and producer information is complete. If there is no strategic marketing plan, in place, then information other than the plan itself must be elicited from the producer. In particular, in step 122 information is obtained concerning the producer's futures trading experience. The present invention optionally uses futures trading, and is also capable of taking into account the personal preferences of a producer. If the producer is determined to have futures trading experience in step 122, then the step 102 of eliciting operation and producer information is complete. If the producer does not have futures trading experience then in step 124, a characterization is made of which market tools are tolerated by the producer. For example, just because a particular producer has not used futures trading before does not mean that they are not amenable to using futures trading. The strategic marketing plan, later takes into account which market tools, such as futures trading or cash-only tools are amenable to the producer. In addition, the strategic marketing plan takes into account what degree of risk is a producer amenable to when using market tools. The characterization of market tools may determine whether the producer pre-sells or would be amenable to pre-selling using futures as well as whether the producer pre-sells or would be amenable to pre-selling grains. Characterization of market tools that a producer is amenable to can be categorized as low tolerance, conservative with the need for more information, and open with a high tolerance for market tools. The ultimate selection of the particular market tools to be used should also involve the financial risk level of the operation as will later be determined and may also involve the input of lenders.

Figure 2B:
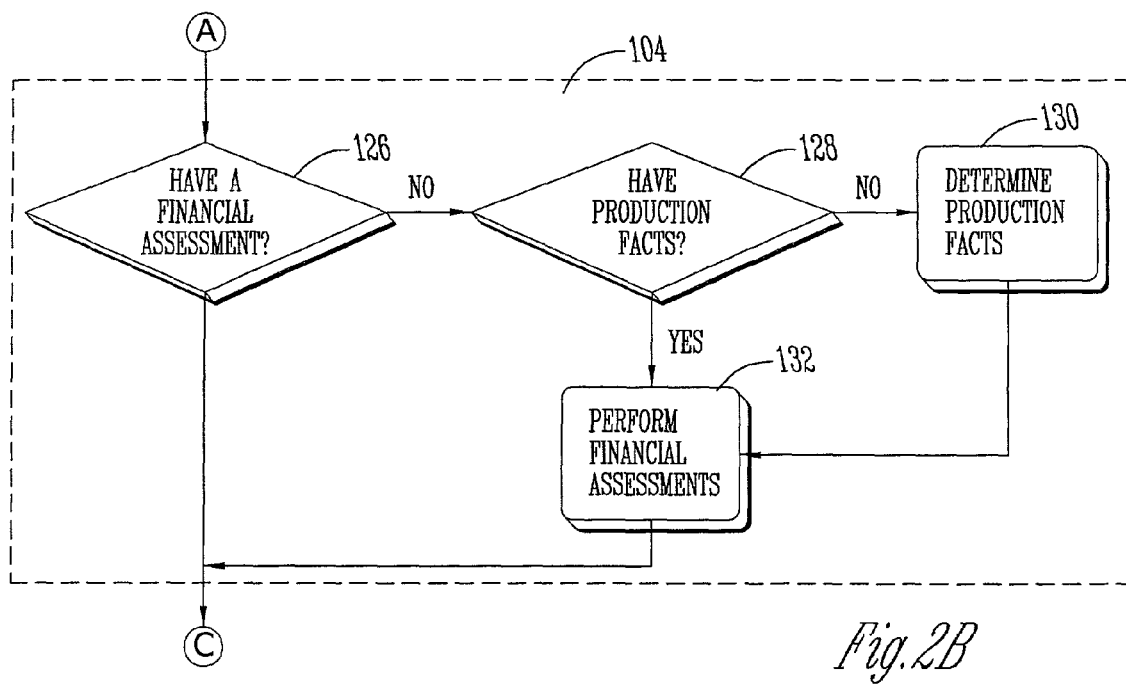
FIG. 2B is a flow chart showing one embodiment of the step of performing a financial assessment.

If a producer does have a written strategic marketing plan in place, or once other information has been elicited from the producer, then in step 104, a financial assessment is performed. The financial assessment step 104 is best shown in FIG. 2B. In step 126, it is determined whether or not a financial assessment is already available. For example a financial assessment may be available in whole or part from a previous strategic marketing plan. If there is already a current financial assessment, then step 104 is complete. If there is not a current financial assessment in place, then step 128 determines if production facts are available. If production facts are not unavailable then production facts are determined in step 130. Production facts include without limitation such information in the context of a grain operation, the number of acres farmed that are owned, the number of acres farmed that are cash rent, the number of acres farmed that are crop share, the amount of annual farm payments, annual cash rent, the nominal annual grain sales, the total number of bushels of on-farm storage capacity, the amount of available on-farm storage capacity, and the major markets where the producer sells grain. Production information may also include the number of total bushels pre-sold, the pre-selling price per bushel, the total number of bushels that are not pre-sold, the expected price for the total bushels that are not pre-sold, total government payments, the total expected income, and the total income assured through federal crop insurance.

Once the production information is obtained, a financial assessment is performed in step 132. A financial assessment may include a financial summary of grain business or livestock business. For example, when the agricultural producer has a grain business, the financial summary may include a balance sheet summary, and a summary of crop operation. Financial summaries, such as balance sheets, and summaries of crop operations are well known in the art. The financial assessment is used to determine financial ratios; profitability of the business as a whole; producer capability; repayment capacity; and enterprise analysis of which product mix offers the most profit. In addition to factors relating to these parameters, the financial rating may also take into account a number of credit parameters determined in the financial assessment, these credit parameters of particular interest to lenders. These credit parameters may include such information as whether the producer has an acceptable credit bureau report; whether the producer has acceptable financial references; whether a first security is available; whether there is a complete financial information available; whether the balance statement is current or not; whether there is an income and expense projection; whether there are positive tax returns; the age of the producer, the region of the producer; the number of desirable tillable acres; the line of credit per acre required; the total loan request size; the debt/asset ratio; the current ratio; the repayment margin; and other factors that reflect upon the producer's credit.

Figure 2C:
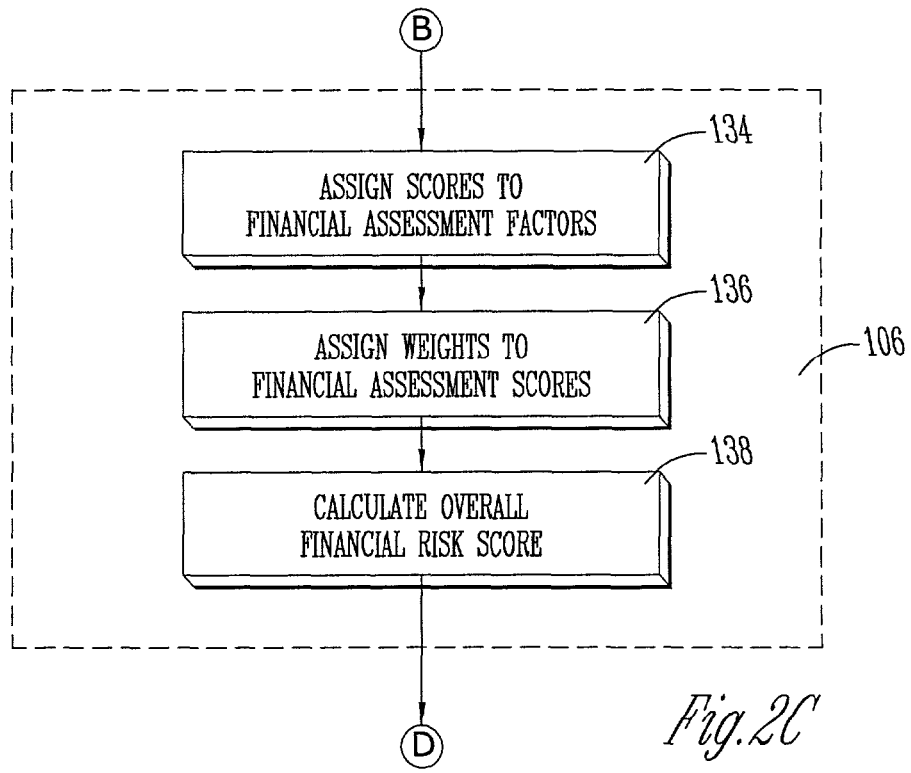
FIG. 2C is a flow chart showing one embodiment of the step of calculating financial risk.

Once a financial assessment has been performed in step 104, the financial risks can optionally be evaluated in step 106. Step 106 is best shown in FIG. 2C. In step 134 scores are assigned to different financial assessment factors. A financial risk rating score of 1 to 5 is assigned to each factor in step 134. Within the rating system, a 1 is the best and 5 is worst. The present invention contemplates that other rating systems could be used with a different scale or values. The rating system emphasizes the business liquidity, the repayment capacity, the business profitability, the business financial efficiency, borrowings per unit, and Z-Factor analyses.

The rating system considers the factors acquired in the financial assessment developed by the applicant.

The various factors are assigned a score based upon their range. The factors used will now be discussed and the ranges and associated score for each factor in a preferred embodiment will be given.

Current ratio is the ratio of current assets to current liabilities. If this ratio is greater than or equal to 1.5 then a score of 1 may be assigned. If this ratio is less than 1.5 and greater than or equal to 1.25 then a score of 2 may be assigned. If the score is greater than or equal to 1.15 and less than 1.25 then a score of 3 may be assigned. If this score is greater than or equal to 1.00 and is less than 1.15 then a score of 4 may be assigned. If this score is less than 1.00 then a score of 5 is assigned. Thus the lower the asset to liability ratio the higher the score that is assigned.

The collateral coverage ratio is the ratio between the collateral position to the remaining principle. If the collateral coverage ratio is 2.00 or greater, then a score of 1 is assigned. If the collateral coverage ratio is greater than or equal to 1.50 and the collateral coverage ratio is less than 2.00 then a score of 2 is assigned. If the collateral coverage ratio is greater than or equal to 1.25 and less than 1.50, then a score of 3 is assigned. If the collateral coverage ratio is greater than or equal to 1.00 and less than 1.25 then a score of 4 is assigned. If the collateral coverage ratio is less than 1.00 then a score of 5 is assigned. The greater the ratio of the collateral position to the remaining principle the lower the score assigned.

Financial efficiency is the operating expense ratio excluding interest and deposits. Financial efficiency is calculated as the ratio of the total operating expense (excluding fixed interest, capital lease interest, depreciation, and operating interest) to the gross operating income. If the financial efficiency is less than 0.65 then a score of 1 is assigned. If the financial efficiency ratio is greater than or equal to 0.65 and less than 0.75 then a score of 2 is assigned. If the financial efficiency ratio is greater than or equal to 0.75 and less than 0.86 then a score of 3 is assigned. If the financial efficiency is greater than or equal to 0.86 and less than 1.00 then a score of 4 is assigned. If the financial efficiency is greater than 1.00 then a score of 5 is assigned. The greater the financial efficiency ratio, the higher the score assigned.

The Z factor analysis provides a quantification of a business's finances. The present invention contemplates that other types of multivariate analysis could be used in place of the Z-factor analysis. When the Z factor is greater than 2.90, a score of 1 is assigned. A score of 1 represents a healthy business. When the Z factor is greater than or equal to 2.5 and less than or equal to 2.9, a score of 2 is assigned. When the Z factor is greater than or equal to 2.0 and less than 2.5, a score of 3 is assigned. When the Z factor is greater than or equal to 1.81 and less than 2.0 a score of 4 is assigned. When the Z factor is less than 1.81, a score of 5 is assigned. The greater the score, the greater the likelihood of business failure. The greater the Z factor, the lower the score.

The Z-factor used in the present invention is a multiple discriminant analysis based in part on the work of Altman. The Z-factor used in the present invention is adapted to a traditional agricultural business. The Z factor is calculated as:

$$Z = 1.2 X_1 + 1.4 X_2 + 3.3 X_3 + 0.6 X_4 + 1.0 X_5$$

where:
$X_1$ is defined as (working capital)/(total assets)
$X_2$ is defined as (net worth)/(total assets)
$X_3$ is defined as (net profit before depreciation, taxes and interest)/(total assets)
$X_4$ is defined as (net worth)/(total liabilities)
$X_5$ is defined as (gross operating income)/(total assets)

The LOC to net worth ratio is the ratio of the amount of the line of credit to net worth. When this ratio is less than 0.50, a score of 1 is assigned. When this ratio is greater than or equal to 0.50 and less than 1.00, a score of 2 is assigned. When this ratio is greater than or equal to 1.00 and less than 2.00 a score of 3 is assigned. When this ratio is greater than or equal to 2.00 and less than 3.00, a score of 4 is assigned. When this ratio is 3.00 or greater, a score of 5 is assigned. The greater the ratio of a line of credit to the net worth, the greater the score.

The leverage ratio is the ratio of the total liabilities to the total assets. When the leverage ratio is less than or equal to 40%, a score of 1 is assigned. When the leverage ratio is greater than 40% and less than or equal to 60%, a score of 2 is assigned. When the leverage ratio is greater than 60% and less than or equal to 70%, a score of 3 is assigned. When the leverage ratio is greater than 70% and less than or equal to 80%, a score of 4 is assigned. When the leverage ratio is greater than 80%, a score of 5 is assigned. The lower the leverage ratio, the lower the score.

The debt service cover is the excess cash flow from the operation that can be used to service debt. When the debt service coverage ratio is greater than or equal to 1.40, a score of 1 is assigned. When a debt service coverage ratio is greater than or equal to 1.30 and less than 1.40, a score of 2 is assigned. When a debt service cover is greater than or equal to 1.20 and less than 1.30, a score of 3 is assigned. When a debt service cover is greater than or equal to 1.10 and less than 1.20, a score of 4 is assigned. When a debt service cover is less than 1.10, a score of 5 is assigned. The greater the debt service cover ratio, the higher the score.

The marginal income rate is the ratio of operational income over variable costs. When the marginal income rate is greater than 0.48, a score of 1 is assigned. When the marginal income rate is greater than or equal to 0.40 and less than or equal to 0.48, a score of 2 is assigned. When the marginal income rate is greater than or equal to 0.30 and less than 0.40, a score of 3 is assigned. When the marginal income rate is 0.20 or greater and is less than 0.30, a score of 4 is assigned. If the marginal income rate is less than 0.20, a score of 5 is assigned.

In a preferred embodiment, the score associated with the debt service coverage and the marginal income rate are combined and an average score is taken. This average score is the repayment ability. The repayment ability then forms a part of the weighted average used in the financial risks.

Another factor is the percentage of return on assets. When this percentage is greater than 6%, a score of 1 is assigned. When this score is greater than 4% and less than or equal to 6%, a score of 2 is assigned. When this score is greater than or equal to 3% and less then 4%, a score of 3 is assigned. When the return on assets range is greater than or equal to 2% and less than 3%, a score of 4 is assigned. When the return on assets ratio is less than 2%, a score of 5 is assigned. The greater the percentage return on assets, the lower the risk and thus the lower the score.

The operating profit ratio is the ratio of the difference of expenses and interest over income. When the operating profit ratio is greater than or equal to 0.35, a score of 1 is assigned. When the operating profit ratio is greater than or equal to 0.25, and less than 0.35, a score of 2 is assigned. When the operating profit ratio is greater than or equal to 0.15 and less than 0.25, a score of 3 is assigned. When the operating profit ratio is greater than or equal to 0.05 and less than 0.15, a score of 4 is assigned. When the operating profit ratio is less than 0.05, a score of 5 is assigned. The greater the operating profit ratio, the lower the risk associated with the enterprise and a lower score is assigned.

The profitability factor is the average combined score of the return on assets and the operating profit ratio.

The marketing plan factor is a number related to the quality of the marketing plan with the lower number being assigned to the higher quality plan. For example, a well defined cash plan and marketing goals within the marketing plan may be assigned a score of 1. When there is no written marketing plan, but there is a good growth history for the enterprise, a score of 2 may be assigned to the marketing plan factor. When there is no written marketing plan, but the production operation has marketing goals, a score of 3 is assigned to the marketing plan factor. When there is no written plan and there is average progress in the operation, a score of 4 is assigned to the marketing plan factor. When there is no written plan and slow progress in the operation, then a score of 5 may be assigned to the marketing plan factor.

A credit history score may also be assigned to the enterprise and producer based upon the credit history record. An excellent credit history record rates a score of 1. A credit history where there are only a few delinquencies rates a score of 2. A credit history with many delinquencies rates a 3. A credit history with judgements and/or pending bankruptcy rate a 4. A credit history with judgements and/or bankruptcy losses rates a score of 5. The better the credit history, the lower the score.

The personal character of an agricultural operator is quantified on a scale of 1 to 5. When the operator or producer has goals, business and personal planning, and has a strong business and family character, a score of 1 is assigned to the personal character. When the producer has some goals, business and personal planning, and good business and family character, a score of 2 is assigned to the personal character of the producer. When the producer has few goals and has some character flaws or other adversity, a score of 3 is assigned to the personal character of the operator. When the operator has no goals and may be of questionable character, a score of 4 is assigned to the personal character of the operator. When the operator has a poor attitude and no goals, then a score of 5 may be assigned to the operator.

The credit history score and the personal character score are averaged into a single score. At this time, all of the different scores are available for the current ratio, leverage ratio, collateral coverage ratio, repayment ability, profitability, financial efficiency, Z-factor analysis, LOC to net worth, marketing plan, and credit history/personal character.

The factors are given a weight in step 136 according to financial importance with greater weights being accorded to those scores of greater importance and lower weights being assigned to those scores of lesser importance. Each score is weighted in step 136 and then summed in step 138 to produce an overall risk quantifier.

The following table summarizes weights to be accorded various factors:

| | |
|---|---|
| Current Ratio | 10% |
| Leverage Ratio | 10% |
| Collateral Coverage Ratio | 5% |
| Repayment Ability | 10% |
| Profitability | 10% |
| Financial Efficiency | 10% |
| Z Factor Analysis | 20% |
| LOC to Net worth | 10% |
| Marketing Plan | 5% |
| Credit History and Personal Character | 10% |

The present invention contemplates that other weights may be given and other financial assessment factors may be used. In addition, different scales or ranges may be used in describing the scores. Each of these scores may then be assigned a weight and an overall risk assessment score is calculated as a weighted average of these scores.

The weighted average produces an overall financial risk assessment score. A low score such as between 1.0 and 1.5 indicates that the production operation is not a financial risk. A high score such as 4.5 or 5.0 indicate that the operation is a financial risk. A rating of 1 to 5 is assigned based on the weighted score. The rating may be an integer number, but preferably has two ore more significant digits.

An identifying code may be assigned to the score, the code identifying the risk associated with the overall score, as given in the table below:

| SCORE | CODE |
|---|---|
| 1.00 | elite |
| 1.50 | elite |
| 2.00 | grower one |
| 2.50 | grower two |
| 3.50 | grower three |

-continued

| SCORE | CODE |
|---|---|
| 4.50 | risk |
| 5.00 | risk |

This code, may be part of a matrix in which different marketing strategies and recommendations are made based upon the code. The present invention contemplates that other identifying codes may be used, including codes correlating to greater or smaller ranges of the overall score.

Figure 2D:
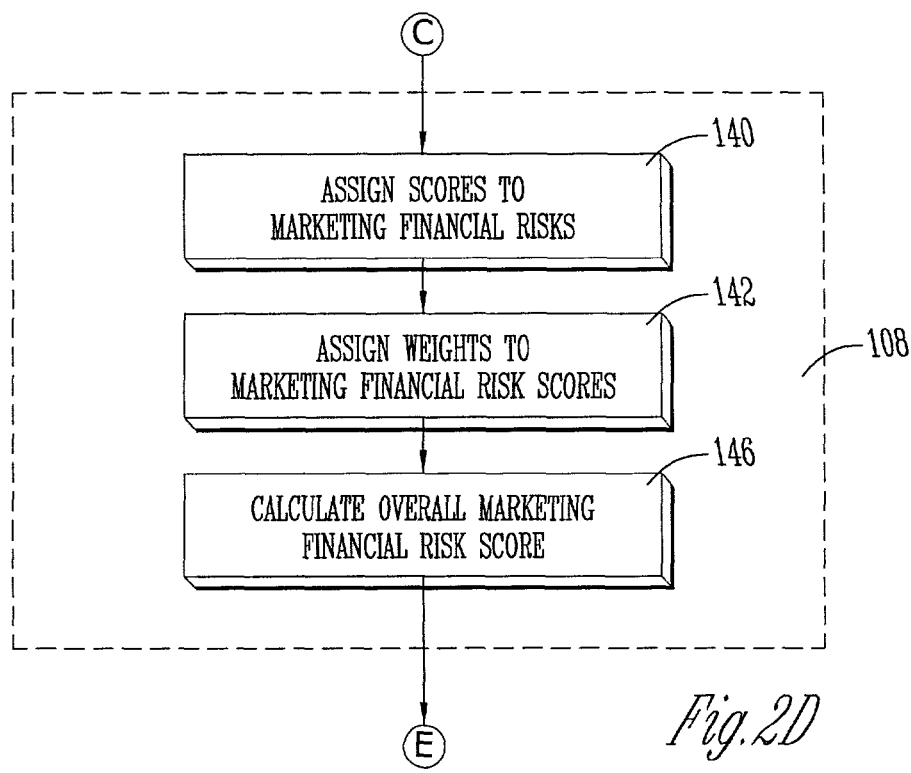
FIG. 2D is a flow chart showing one embodiment of the step of calculating price risks.

Once the financial risks have been evaluated in step 106, marketing financial risk is determined in step 108. FIG. 2D best shows the determination of marketing financial risks. Marketing financial risks are different from financial risks in that marketing financial risks are more attuned to markets and to income than financial risks. The determination of marketing financial risks in this step permits financial risks to later be combined with price risks.

The prior calculation of the financial risks is optional to the system. However, some of the calculations required in calculating financial risk are the same or similar to those calculated in the marketing financial risk. In addition, the calculation of the financial risks provides a convenient score that characterizes the type of financial information that is important to lenders and/or creditors, independent of market risks. The marketing financial risks, as previously explained, and as will be further shown, take into account risks that are conventionally not computed or examined by a lender.

Marketing financial risk factors include the line of credit per acre ratio, the ratio of line of credit to assured income, the current ratio of assets to liabilities, the ratio of working capital to total crop expense, the financial efficiency which is the operating expense ratio excluding interest and deposits, the asset turnover ratio which is the ratio of the gross revenue to the total farm assets, the interest expense ratio which is the ratio of interest expense to gross revenue, the operating profit ratio, the return on assets ratio, the line of credit to net worth ratio, the leverage ratio which is the ratio of total liabilities to total assets, the Z factor analysis, the repayment margin which is the debt service coverage, and the marginal income rate.

In step 140, scores are assigned to each marketing financial risk factor. For example, when the line or credit per acre is less than $180 per acre, a score of 1 is assigned. When the line of credit per acre is $180 per acre to $240 per acre, a score of 2 is assigned. When the line of credit per acre is greater than $240 per acre, a score of 3 is assigned. The present invention contemplates that line of credit and other factors would be adjusted according to geographic conditions, crops, and other historical data as may be suggested or required by a particular application.

When the ratio of line of credit to net worth is less than 50 percent a score of 1 is assigned. When the ratio of line of credit to net worth is between 50 percent and 80 percent, a score of 2 is assigned. When the ratio of line of credit to net worth is greater than 80 percent, a score of 3 is assigned.

When the ratio of line of credit to assured income is less than 65 percent a score of 1 is assigned. When the ratio of line of credit to assured income is between 65 percent and 85 percent, a score of 2 is assigned. When the ratio of line of credit to assured income is greater than 85 percent, a score of 3 is assigned.

When the leverage ratio is less than 40 percent a score of 1 is assigned. When the leverage ratio is between 40 percent and 60 percent, a score of 2 is assigned. When the leverage ratio is greater than 60 percent, a score of 3 is assigned.

When the current ratio is greater than 1.5 a score of 1 is assigned. When the current ratio is between 1.15 and 1.5, a score of 2 is assigned. When the current ratio is less than 1.15, a score of 3 is assigned.

When the Z factor analysis is greater than 2.90 a score of 1 is assigned. When the Z factor analysis is between 1.81 and 2.90, a factor of 2 is assigned. When the Z factor analysis is less than 1.81, a score of 3 is assigned.

When the working capital to total crop expense ratio is greater than 20 percent a score of 1 is assigned When the working capital to total crop expense ratio is between 10 percent and 20 percent, a score of 2 is assigned. When the working capital to total crop expense ratio is less than 10 percent, a score of 3 is assigned.

When the repayment margin (debt service coverage) is greater than 1.40, a score of 1 is assigned. When the repayment margin is between 1.20 and 1.40, a score of 2 is assigned when the repayment margin is less than 1.20, a score of 3 is assigned.

When the financial efficiency (operating expense ratio excluding interests and deposits) is less than 0.65, a score of 1 is assigned. When the financial efficiency is between 0.65 and 0.80, a score of 2 is assigned When the financial efficiency is greater than 0.80, a score of 3 is assigned.

When the marginal income rate is greater than 0.48, a score of 1 is assigned. When the marginal income rate is between 0.32 and 0.48, a score of 2 is assigned. When the marginal income rate is less than 0.32, a score of 3 is assigned.

When the asset turnover ratio (ratio of gross revenue to total farm assets) is greater than 80 percent a score of 1 is assigned When the asset turnover ratio is between 50 percent and 80 percent, a score of 2 is assigned When the asset turnover ratio is less than 50 percent a score of 3 is assigned.

When the interest expense ratio (ratio of interest expense to gross revenue) is less than 8 percent, a score of 1 is assigned. When the interest expense ratio is between 8 percent and 20 percent a score of 2 is assigned. When the interest expense is greater than 20 percent, a score of 3 is assigned.

When the operating profit ratio is greater than 35 percent, a score of 1 is assigned. When the operating profit ratio is between 16 percent and 35 percent, a score of 2 is assigned. When the operating profit ratio is less than 16 percent a score of 3 is assigned.

When the return on assets is greater than 6 percent, a score of 1 is assigned. when the return on assets is between 2.5 percent and 6 percent, a score of 2 is assigned. When the return on assets is less than 2.5 percent, a score of 3 is assigned.

These particular selections of ratings based on the value of the various factors may be altered as may be needed to ensure desired results, adjust for economic conditions, or other adjustments that may be suggested by a particular crop, economic environment, or market conditions. The present invention is in no way limited to the precise selection of factors, the ranges for each factor, or the weight to be accorded to each factor.

In step 142, weights are accorded to the marketing financial risk scores. The following table summarizes weights to be accorded various factors:

| FACTOR | WEIGHT |
| --- | --- |
| LOC $/Acre | 5% |
| LOC/Assured Income | 6% |
| Current Ratio | 11% |
| WC/Total Crop Expense | 6% |
| Operating Expense Ratio | 5% |
| Asset Turnover Ratio | 5% |
| Interest Expense Ratio | 5% |
| Operating Profit | 7% |
| Return on Assets | 8% |
| LOC to Net Worth | 5% |
| Leverage Ratio | 5% |
| Z Factor Analysis | 10% |
| Repayment Margin | 10% |
| Marginal Income Rate | 12% |

An overall marketing financial risk score is calculated in step 146 by weighting the marketing financial risk scores according to the weights assigned in step 142. This then completes step 108.

Figure 2E:
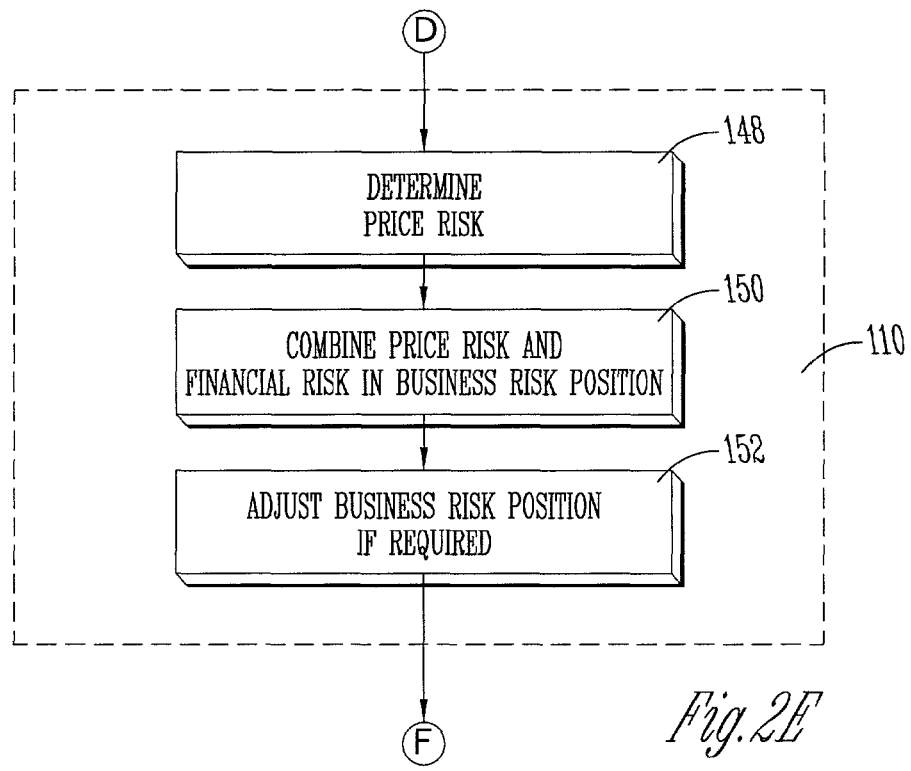
FIG. 2E is a flow chart showing one embodiment of the step of calculating business risk position.

In step 110, business risk position is calculated. Price risk is the probability that once a price reaches a particular amount, the price will go down. This step is best shown in FIG. 2E. In FIG. 2E, price risks are determined in step 148. Price risk is determined by the market risks. Price risks include fundamental supply and demand factors, technical factors, probabilities of price targets, parabolic analysis, multivariate analysis, or other types of analysis as a particular market may suggest. In the present invention, price risks may be determined by a marketing service. As price risk is the market risk, it requires a detailed analysis of market conditions. This type of analysis is within the knowledge of one skilled in the art of market analysis, however, is not the type of calculation or analysis that is routinely performed by agricultural producers or lenders. The particular methodology that a marketing service uses to calculate price risk may vary, however, the price risk calculated should be as accurate as possible. The price risk is a number in the range of 0.2 to 0.66 with a higher number indicating higher price risk and a lower number indicating lower price risk.

After the analysis of the price risks, the financial risk status and the price risk status are combined through multiplication in step 150. The business risk position is a quantifier of the amount of risk associated with a producer's production operation. A scale is created based on the different business risks to create an overall financial risk. Different categories may be are assigned to different levels of risk according to the following table:

| CATEGORY OF RISK | LEVEL OF RISK |
| --- | --- |
| Low risk | 1.00-1.45 |
| Middle risk | 1.46-2.50 |
| High risk | Over 2.50 |

Other numbers with other ranges may be created to quantify risk. The present invention contemplates these and other variations. The business risk position is the product of financial risk and price risk. The value of the business risk position guides an agricultural producer in determining how many units to sell, pre-sell, or what marketing tools to use. The higher the business risk position, the greater the amount of the commodity that should be pre-sold to guarantee income. Thus if there is high price risk, high financial risk, or a high combination of price risk and financial risk, then the higher business risk position indicates that more of a commodity should be pre-sold.

Business risk position can be adjusted to form a differential net business risk position as shown in step 152 of FIG. 2E. If break-even prices are greater than target market prices, then there is greater risk associated with the enterprise. To adjust for this, 0.5 can be added to the business risk position to form the differential net business risk position that compensates for this contingency. Then the differential net business risk position can be used in place of the business risk position in subsequent calculations.

Figure 2F:
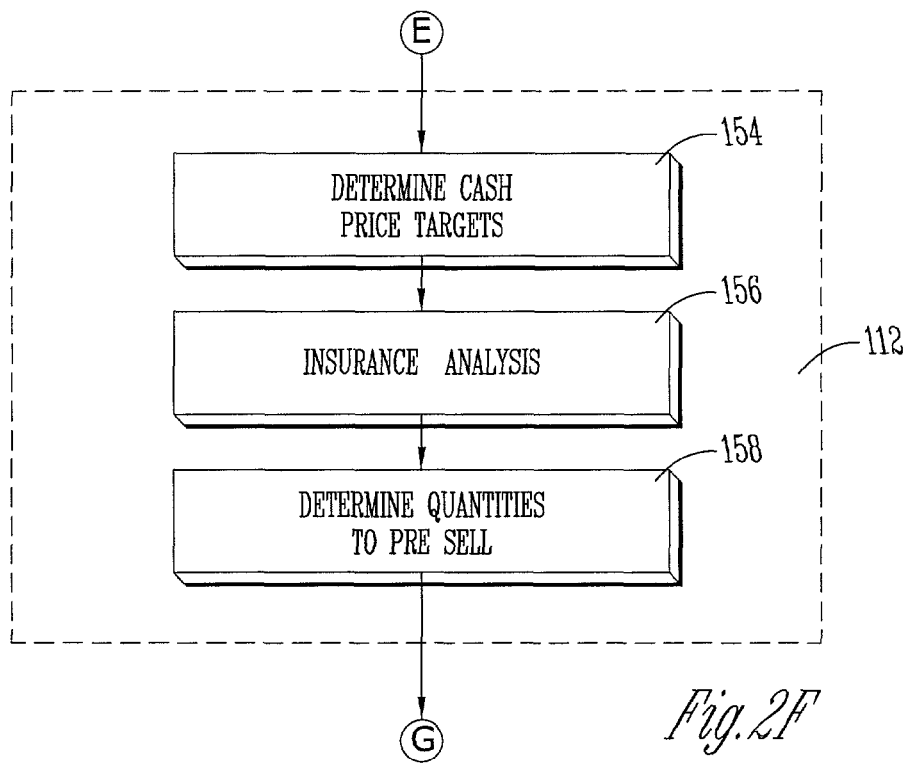
FIG. 2F is a flow chart showing one embodiment of the step of revenue protection.
Figure 2G:
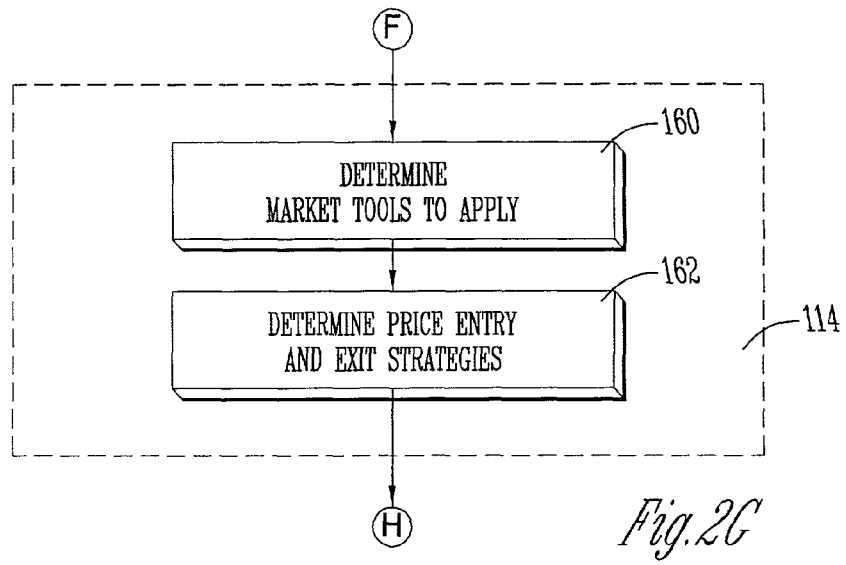
FIG. 2G is a flow chart showing one embodiment of the step of profit planning.
Figure 2H:
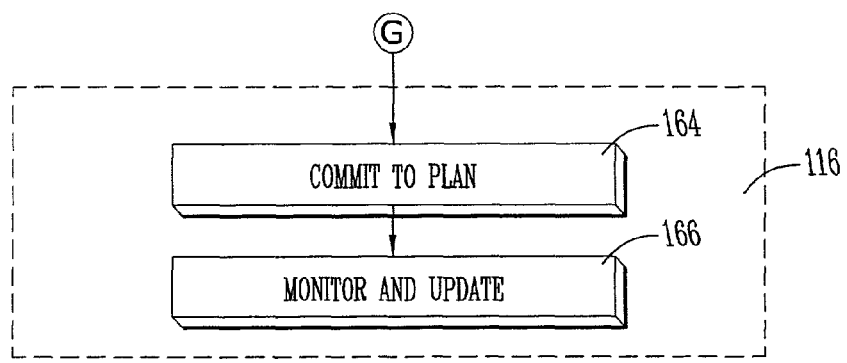
FIG. 2H is a flow chart showing one embodiment of the step of implementation.

Once the business risk position has been determined, revenue protection is performed in step 112. This step is shown best in FIG. 2F. This step may include a best scenario analysis and also may include an analysis concerning the price protection tools to use. The price protection tools include cash sales, forward contracting, basis contracts, buying puts, selling puts, buying calls, and futures. The price protection tools used are dependent upon the business risk position in part.

These price protection tools are used under certain conditions. Cash sales are used when the inventory is in hand; the target price has been reached; the basis is average or better; or other means of ownership has less risk than owning the inventory; cash flow mandates conversion to cash; or in the case of livestock, they are market ready.

Forward contracting should be used when the inventory is in hand or there is a very high probability of the production; the basis is average or above; and the time of delivery correlates with cash flow needs.

Basis contracts are only used as a marketing tool when the basis is in the top 15% of historic values but minimum cash price target has not been reached; the delivery date works; and there is a very high probability of production.

Buy inputs should be used as a price protection tool only when the price protection target has not been reached but the time limitation has occurred; or the put can guarantee a profitable storage income hedge. However, there are situations where put ownership is also preferred. If two or more of the following exist, then put ownership is preferred: (1) uncertainty of production, (2) below average basis, (3) price target met, (4) unknown government production/price programs.

Selling puts should be used as a price protection tool when the inventory is in hand or there is a very high probability of the production, and the calls sold minus the normal basis equals a cash price at least 10% greater than the protection target.

Buying calls should be used as a price protection tool only when a cash sale or forward contract has been made and the net premium risk is less than physical inventory ownership.

Futures should be used as a price protection tool only when ownership is combined with a put, or sale is combined with a call produces less risk than a straight option, and none of the other tools are applicable.

When the business risk position is over 66%, the marketing tool that should be used is pre-selling cash markets of 75% to 100% of the assured units. Price protection marketing tools can then be used on the balance of production.

When the business risk position is between 33% and 66% then pre-selling cash markets of 40% to 75% of assured units is recommended. Price protection marketing tools should then be used on the balance of production if market prices are above enterprise break-even levels. If the business risk position is between 20% and 33% then pre-selling to cash markets 20% to 40% of assured units is recommended. Price protection marketing tools should then be used on the balance of production if market prices are above break-even levels.

Special considerations also occur when break-even prices are over expected market prices. When this occurs, as previously explained, the total risk score is adjusted by 0.5 or 50 percentage points as previously explained. In addition, high financial risk producers should sell enough to cover loan levels when their production or enterprise is financed. In high risk price situations where a producer does not use a marketing plan then the federal government loan price (sealing price) for cash flow can be used to set line of credit limits. The sealing price provides some measure of assured income.

For purposes of these calculations, the assured units is defined relative to the particular production enterprises. For example, in grain businesses, the assured units can be calculated as the product of the approved production history (APH) and the level of federal crop insurance coverage. For other types of enterprises such as livestock, or if otherwise desired for grain businesses, assured units can be calculated in other ways so long as assured units reflects an accurate number of units that a producer will receive revenue for even if there is crop loss or death loss.

In step 112, revenue protection occurs. Revenue protection is show in FIG. 2F. Revenue protection involves determining cash price targets in step 154, performing a crop insurance analysis in step 156, and determining quantities to pre-sell in step 158.

For purposes of revenue protection calculations, in determining cash price targets in step 154, a high probability of prices reaching a price target and/or going down if the price target is reached is set at about 66%. A low probability of price going down is set at about 20%. This probability may be obtained from a marketing service.

It is to be appreciated that the crop revenue analysis may be performed for grain operations or other type of production operations. The crop revenue plan uses crop revenue coverage such as may be federal crop insurance approved. Examples of crop revenue plans include crop revenue coverage (CRC) and revenue assurance (RA). CRC plans are generally preferred and are generally more acceptable to lenders. These plans may be limited to certain crops. The revenue plans are usually through private insurance companies and co-insured by federal government agency such as the Federal Crop Insurance Corporation (FCIC). The present invention, however, is not limited to these government plans and contemplates use with purely private insurance plans.

An assured income can then be calculated from the level of insurance such as 65%, 70%, 75%, 80%, 85%, multiplied by the APH for a particular crop multiplied by price. The price is set by taking average Chicago Board of Trade (CBOT) future's prices on new crops for a particular crop in a calendar month, usually February for spring planted crops. Thus based on the insurance level, future's price and the approved production history, assured income can be calculated.

In order to perform a crop revenue analysis in the insurance analysis step 156, the present invention requires a number of inputs. One of such inputs is the type of crop. The present invention contemplates that the crop may be corn, soybeans, popcorn, wheat, cotton, rice, or tobacco. The present invention contemplates other types of crops that may also be used. An input for loan amount is also required. The loan amount is the total operating loan desired for the entire operation for short term operating needs. Another input is the total acres for growing the crop. The total acres represents the total tillable number of acres for row crops and forage crops for feed or sale. This number may include only the insurable crops. For convenience purposes, the present invention can calculate the requested loan per acre. This number is of course the loan amount as previously discussed divided by the total acres.

The present invention also contemplates that any two of the three values need to be entered as the third value can be calculated from the other two. In addition, there is an interest rate input for the interest rate on the loan.

The present invention also has a number of market factor inputs. These include the average future price to pre-sell, the probability of reaching that price, expected cash basis, expected fall future price, probability of reaching price, and expected fall cash basis.

The average future price to pre-sell is used for determining cash price targets. The pre-sell figure is a new crop, Chicago Board of Trade (CBOT) future's price and may be supplied by a marketing service on a periodic basis such as weekly or daily. The probability of reaching price is a probability factor that may also be supplied by a market service. Of course, the producer and loan approval personnel will also review this probability and agree upon it. The expected cash basis market factor represents the cash basis that can be locked in for later future's price finalization or otherwise finalized with the pre-sell cash price. The expected fall future price represents the expected new crop (CBOT) future's price in the calendar fall time period. In a down trend market, the new crop price will be lower than the average future price to pre-sell. This price would also be supplied by a marketing service on a periodic basis. The probability of each price is a market factor that is the expected probability of the expected fall future price. This market factor can be provided by a marketing service on a periodic basis. The expected fall cash basis is the expected cash basis at harvest time if the cash basis is not locked in or if the cash price is not finalized prior to harvest. This expected fall cash basis may be a number selected in the best judgement of the producer with the consensus of a loan approval personnel.

In addition, inputs include various future's trading options. The market factors include the cost of a call on pre-sold per unit grain, the cost of call on unsold per unit grain, the cost input on pre-sold per unit grain, the cost input on unsold per unit grain, and the LDP value on pre-sold grain on a per unit basis, and the minimum price for unsold harvest.

In addition, the model includes CRC or RA inputs at various coverage levels such as 65%, 70%, 75%, 80%, and 85%. The costs are unique to the producer's crop insurance APH and county location.

The model also includes a number of yield and prices inputs. These include the weighted APH for the crop, the expected spring price for the crop, and expected harvest price for the crop. In addition, inputs for either the number of anticipated pre-sold bushels or the percent of the crop that is anticipated to be pre-sold is required. The present invention also may have inputs for other governmental programs. For example, the present invention may have an input for an estimated freedom to farm payment per acre. The model also includes an input for the actual harvest yield which is the actual anticipated harvest yield. The actual harvest yield is usually equal to or greater than the APH.

The model also includes inputs for whether underwriting on calls is allowed or not and whether underwriting on inputs are allowed or not. The present invention includes input for the federal government established county loan price (sealing price).

Based upon the inputs including those made available from information service as will be explained in greater detail, calculations are made for a number of outputs. These calculations include calculations for each crop insurance plan considered.

The present invention contemplates that these calculations may be performed within a computer spreadsheet application or in a standalone computer program, including a web-enabled application, or a program residing on a server or web server, or by an applet or servlet, or script. FIGS. 4, 5, and 6 show representations of a spreadsheet embodiment of the crop insurance calculation component of the present invention. In FIG. 4, a worksheet for information input is shown. In FIG. 5, a worksheet showing the calculations that the computer program makes are shown. The worksheet shown in FIG. 5 may be repeated for different crop insurance plans. For example FIG. 5 is for a 65% level of crop insurance coverage. Additional worksheets may be used for 70%, 75%, 80%, and 85%. The present invention contemplates that only one worksheet need to be used in a spreadsheet application. The present invention may alternatively be embodied in other types of computer applications such as are known in the art.

The income under each crop revenue insurance plan can then be compared to the revenue of the other plans and of the revenue when there is no plan. In addition, the available assured income is also calculated. This calculation provides the agricultural operator or producer as well as a lender with some assurance as to the revenue when a particular revenue plan is implemented. FIG. 6 is a representation of an output worksheet showing a comparison of different crop revenue plans.

Because the guaranteed level is based in part upon CBOT future's prices, the guaranteed or assured income level can increase. This increase occurs when the CBOT future's prices increase over the course of the year and for any reason. When this occurs the fall income guarantee level replaces the spring level. Thus the guaranteed income level of the revenue plan can increase over the spring level but cannot fall below the spring level.

Thus the revenue protection component of the plan permits marketing and pre-selling to add to the revenue. The future's prices are allowed to increase and therefore raise the guaranteed income level, the producer can then replace or deliver units from the market place in order to meet the pre-sold market contracts using insurance proceeds if necessary.

In step 158, the quantification of high probability prices and best product mixes are brought together with the qualifying processes and a decision making and work tendencies of the producer. Using the previously calculated business risk position an optimum percentage of units to pre-sell is determined. This step takes into account the goals and objectives of the producer concerning prices and profit. This step takes into account the loan objectives of the producer, the maximization of income, and the establishment of the number of units that can be pre-sold. This step also takes into account the enterprise wide analysis for the best product mix and highest profit potential.

In the profit planning step 114, additional profit planning takes place. In step 160, a determination of which market tools to apply is made, based in part upon the producer's comfort level with various market tools and the financial risk of the producer. Lender involvement is also taken into consideration which also impacts how market tools are used or not used so that repayment obligations can be better assured. Also, in step 162 price entry and exit strategies are determined.

In the profit planning step, information concerning the best cash markets and the best cash basis is considered for markets within a certain geographical distance from a producer. Preferably, in grain operations, the distance is approximately 100 miles, however, the present invention contemplates different distances such as circumstances may require otherwise make desirable. In order to carry out this step, updated pricing information and market information is needed. This information may include a future options opening position for a particular commodity. For instance, December new crop corn opens approximately April of the previous year. This would allow approximately 20 months of market trading.

Fundamental data about supply and demand are recorded and projections made concerning a size of new crop before planting. This information includes the intended planted acres, predicted weather conditions, and trend line yields to forecast the ultimate size of the crops.

Technical information about each commodity and their trading month options are also recorded and kept track of. Such technical information includes, but is not limited to, daily trading open, close, high, low; divergences and price consolidation; price volatility linked with the fundamental supply and demand factors on a daily basis; historical chart movements; and other information that may be useful in predicting price.

New highs from the opening price positions, when they occur, are measured and compared to historic situations.

New lows from the opening price position are recorded, including when they occurred, they are measured and also compared to historic situations.

Retracement levels are measured, dated, and compared to historical conditions so as to mathematically set forecasts of price trends and price levels. Retracement levels include 38.2%, 50%, 61.8%. The dependability of retracement is that if the market moves up or down, the traders will liquidate their positions to take profit. As profits are taken, other traders tend to take the profit as well. As they do, the market goes the other way. The most dependable retracement line is 38.2%. This relies upon the incentive of traders to take profits, should the retracement line be broken (markets move more than the retracement level).

Thus, the targets and the probabilities of reaching those targets are dependent upon a vast amount of information that continuously changes and requires updating. However, this information is important and it gives the basis for objective reasoning for the producer so as to be able to make decisions easier and more profitably.

This type of calculation includes parabolic measures, BCI for discovering probable price cycle highs and lows, ADX for the average directional movement index, cyclic history, exponential moving average, implied volatility, reverse engineering, and other types of analysis that may be used. The present invention contemplates that this sophisticated market information may be supplied to the agricultural producer, such as through an information service. The information service may provide the information by satellite or other broadcast, by telephone, or over the Internet. The present invention uses this information so that a scale-up selling average may be obtained.

Scale-up selling is a strategy where as a market rises different quantities are sold at different times. Scale-up selling is not used by many because it eliminates the opportunity to sell everything at the market's high price. The probability of being able to realize when a market high occurs is relatively low. Scale-up selling does, however, provide a higher probability of resulting in a higher average. Within the present invention, scale-up selling provides agricultural producers the opportunity to add to an average, increasing income.

The marketing plan is created from the above identified information. The marketing plan may contain a mission statement, written objectives, goals and strategies to meet the objectives, identification of external and internal factors that affect a business, clear income objectives to be realized, clear profit objectives, and an identification of financial risk.

The marketing plan's mission statement provides information concerning the direction of the producer's operation and the marketing tools to be used by the producer to achieve the desired results. The marketing plan's written objectives further define the expectations to be realized in implementing the marketing plan. For example, the objectives may include a specific net income amount to be realized.

In step 116, the plan is implemented by the producer. The marketing plan may be signed to indicate commitment or to indicate to a creditor that the producer will be complying with the total business plan as shown in step 164. The marketing plan may provide the producer with more confidence that cash flow problems will not arise, as these problems and other risks have been anticipated. The marketing plan may also be useful in receiving better financing terms from creditors as creditors are assured that risks have been reduced.

In step 166, the plan is continuously monitored and updated with new market information. It is to be appreciated that the profit planning strategies will change with the markets. This includes new determinations of cash price targets as may be appropriate. The price targets in this step are cash prices. The determination of price targets take into account trailing stop loss orders. Trailing stop orders may be adjusted daily placed with an end use buyer selected by a producer. This assures that a particular price can be protected should the market reverse. Time frame measures, volatility factors, and parabolic measures are considered in setting the trailing stop loss order. A stop-loss order or "stop order" is placed below the market price if it is a sell stop order, or above the market if it is a buy stop order. If the market price reaches the price specified in the stop order, then the stop order becomes a market order to buy or sell. Using stop-loss order strategy, a trader can determine, to some extent, how much money to risk when buying or selling a futures contract.

If the price targets have not yet been determined, then the price targets can be determined by examining the market actuary history, the price risk of each target, the market characteristics for each market, the volatility factors for each market, the parabolic measures for each market, the retracement settings for each market, the option opening positions, the time frames, and the financial risk. Then scale up cash selling to get pivot cash price weighted average is performed.

Once the cash price targets have been determined, the quantities to cash pre-sell and/or price protect are determined. Once the quantities to cash pre-sell and/or price protect have been determined, price "add-on" strategies are determined. Price add-on strategies allow a producer to increase revenue by using marketing tools and strategies, but without risking an assured revenue amount related to the quantities pre-sold. The price add-on strategies involve which market tools are to be used, the price entry strategies to be applied, and the price exit strategies to be applied.

The marketing tools used in the add-on strategies include buying puts and/or calls, selling puts and/or calls, futures, synthetic puts and/or calls, and butterfly and window market strategies. The purpose of add-on strategies is to increase revenue beyond an assured level. The add-on strategies allow a producer to realize revenue greater than an assured level without the risk of not meeting the assured level.

The previous explanation has provided a detailed description of the creation of the marketing plan. It is apparent that the plan is iterative in nature in that the plan may change with the market. In order to do so, market factors are taken into account as previously explained.

Figure 3:
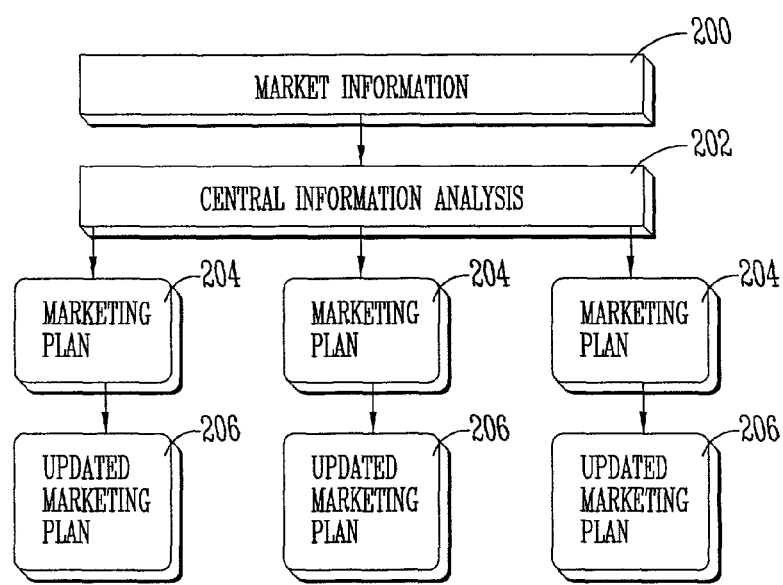
FIG. 3 is a flow chart showing updating of market information according to one embodiment of the present invention.

FIG. 3 shows how the market information is used to update marketing plans. Because marketing data and marketing analysis is used, this same information may be used by numerous agricultural producers with marketing plans. In FIG. 3, the market information 200 is analyzed by a central information analysis center 202. The central information analysis center performs the BCI analysis, the parabolic analysis, the relative strength index determination, or other analyses such as may be used to evaluate the market. The present invention is in no way limited by the particular analyses used to evaluate the market. These calculations are known to agricultural marketing analysts, however, the requirement of having all the market data available does not make it convenient for each producer to make their own calculations.

With respect to this analysis and these calculations, the present invention is not limited to a particular method of making these calculations or a particular analytical technique or combination of analytical techniques.

When performing moving daily average analysis, the present invention contemplates that the short-term graph may be nine days, the intermediate graph may be 21 days, and a long-term graph may be 35 days. This selection of variables in performing the daily average analysis tends to be more responsive when used in combination. When the nine day graph crosses over 21 and when nine and 21 simultaneously cross over 35, a trend reversal is signaled. The above settings are typical for grain. The present invention also contemplates that different variables can be used for different types of grain. For example, for soybeans, the short-term graph may be nine days, the intermediate graph may be 22 days, and the long-term graph may be 35 days.

In performing relative strength index analysis, the present invention contemplates that different periods may be used. For grains, the one suitable RSI period is 18 days. For soybeans, one suitable RSI period is 17 days.

In performing stochastic analysis, the present invention contemplates that different periods may be used. The present invention contemplates that for soybeans, a period of seven days may be used. The present invention also contemplates that for grains, a period of nine days may be used.

The present invention contemplates this market data is communicated to the producers so that each marketing plan 204 may be updated 206. In the present invention, the marketing plan or components thereof may be implemented in MICROSOFT EXCEL or other spreadsheets. The present invention also contemplates that other computer applications may be used. The present invention is in no way limited to a particular type of spreadsheet, but may be implemented in other spreadsheets, other applications, in source code, as an application, as an applet, as a servlet, as a script, or in other embodiments such as would permit a computer to produce the calculations and flow. The present invention contemplates that delivery of the updated information may be performed in numerous ways. For example, the information may be delivered over a satellite link, over the Internet, by facsimile, or by telephone, or other means such as may be convenient and expedient.

An example of the present invention is now given of a specific case scenario. In this example an agricultural producer produces both corn and soybeans. The product plan for the agricultural producer provides for 1090 acres of corn to be planted and 1122 acres of soybeans to planted. the expected yield per acre is 165 bushels of corn per acre and 50 bushels of soybeans per acre. The Farm Service Agency (FSA) base acres is 916 acres of corn with an FSA payment per bushel of $0.33. The FSA yield is set at 137 bushels of corn per acre. The county loan rate or minimum price is $1.77 per bushel for corn and $5.12 per bushel for soybeans. The county differential price (cash price-posted county price) is $0.10 per bushel for corn and $0.18 per bushel for soybeans.

Information concerning production cost per acre is also elicited from the producer. Input costs are $102.48 per acre for corn and $32.50 per acre for soybeans. Fuel and drying costs are $4.13 per acre for corn and $0.00 per acre for soybeans. Other variable costs are $63.20 per acre for both corn and soybeans. These production costs result in total variable costs of $169.81 per acre of corn and $95.70 per acre of soybeans. Crop insurance costs are $20.00 per acre for corn and $20.00 per acre for soybeans. Fixed costs are $85.95 per acre for corn and $85.95 per acre for soybeans. The total enterprise costs are $275.76 per acre for corn and $201.65 per acre for soybeans.

Payments for principal and interest and capital expenditures are also elicited. These include $83,100 for equipment, $0 for land, $78,000 for family withdrawl. In this case there is no expenditure for land, no depreciation, or other types of cost. Variable cost charges per change in production is also calculated. For a 10 percent production change, there is a 3 percent cost change.

Next, a financial analysis of the producer's operation is performed. This analysis is summarized in the following tables. The financials table shows:

| | |
|---|---|
| Current farm assets | $2,104,786 |
| Breeding livestock | 0 |
| Equipment & machinery | 1,967,715 |
| Land & improvements | 3,276,950 |
| Other fixed assets | 0 |
| Total farm assets | $7,349,451 |
| Current farm liabilities | $1,316,687 |
| Intermediate liabilities | 480,364 |
| Long term liabilities | 1,716,136 |
| Total farm liabilities | $3,513,187 |

The operations table shows:

| | |
|---|---|
| NET WORTH | $3,836,264 |
| Gross operating cash income | $1,643,298 |
| Total farm expense | 1,323,328 |
| Fixed interest & capital lease interest | 221,011 |
| Depreciation | 0 |
| Operating interest | 42,068 |
| Other fixed costs | 684,481 |
| Operating profit | $1,267,530 |
| Operating profit ratio | 077 |
| Net profit before taxes | $319,970 |
| Non farm income | 0 |
| Family withdrawl | 0 |
| Provision for taxes | 0 |
| Cash capital expenditures | 0 |
| Available for debt | $540,981 |
| Total debt & lease payments | $380,176 |
| Principle & capital payments | $159,165 |

The key ratio and measures table shows:

| | |
|---|---|
| Z-factor analysis | 2.0 |
| Term debt repay margin | $160,805 |
| Debt service coverage | 1.4230 |
| Current ratio | 1.60 |

-continued

| | |
|---|---|
| Working capital | $788,099 |
| Marginal income rate | 0.7713 |
| Operation profit margin ratio | 0.3548 |
| Leverage ratio | 0.48 |
| Net capital ratio | 0.92 |
| Return on assets | 7.93% |
| Total secured liability | $3,513,187 |
| Total reserve collateral | $3,836,264 |

Based on this financial information the various ratios needed for risk assessment are calculated. The current ratio of current assets ($2,104,786) to current liabilities ($1,316,687) is 1.60 to which a score of 1 is assigned. The leverage ratio of total liabilities ($3,513,187) to total assets ($7,349,451) is 47.8 percent to which a score of 2 is assigned. The collateral coverage ratio of collateral position ($5,532,649) to remaining principal ($3,513,187) is 1.57 to which a score of 1 is assigned. The debt service cover is 1.42 to which a score of 1 is assigned. The financial efficiency is 0.65 to which a score of 1 is assigned. The marginal income rate is 0.77 to which a score of 1 is assigned. The Z-factor analysis is 2.0 to which a score of 3 is assigned. The return on assets is 7.93 percent to which a score of 1 is assigned. the line of credit ($886,653) to net worth ($3,836,264) ratio is 0.23 to which a score of 1 is assigned. The operating profit ratio is 0.35 to which a score of 1 is assigned. The repayment ability score (average combined score of debt service coverage and MIR) is 1. The profitability score (average combined score of return on assets and operating profit ratio) is 1. The marketing plan score is 1 and the credit history/personal character score is also 1.

These scores are then weighted appropriately to result in an overall risk assessment score of 1.50. This overall financial risk assessment score would permit the agricultural operator to be considered an "ELITE" operator. The 1.50 is adjusted to 2.25 as the line of credit per acre was higher than model tolerances. A price risk (0.66) obtained from a marketing service is than multiplied by the marketing financial risk assessment score (2.25) to yield a business risk position of 1.485.

A crop insurance coverage level is calculated to be 75 percent for both corn and soybeans. With 1090 acres of corn having an APH of 142 bushels per acre and a price of $2.86, this results in a total assured income of $332,003. With 1122 acres of soybeans having an APH of 43.0 bushels per acre and a price of $6.07, this results in a total assured income of $219,640 for a total of $551,643 of assured income.

Market factors may also be analyzed to reveal a new crop target price for pre-selling of $2.65 for corn and $6.00 for soybeans. A contract basis of $0.28 for corn and $0.50 for soybeans. An option cost of a put on corn of $0.10 and a put on soybeans of $0.08. An option cost for a call on corn is $0.10. The expected fall basis for corn is $0.50 and the expected fall basis for soybeans is $0.60. The county differential for both soybeans and corn is $0.10.

A breakeven analysis reveals that for production for corn is $0.167. Cash flow breakeven analysis for corn is $2.11 and profitability breakeven analysis for corn is $2.11. LOC (loan) breakeven analysis is $2.09 for corn. For soybeans the production breakeven analysis per bushel is $4.03, the cash flow breakeven analysis is $5.49, the profitability break even analysis is $5.49, and the LOC (loan) required is $5.44.

Based on this information, pre-selling of 100 percent of assured bushels of both corn and soybeans is recommended. This is 107 bushels per acre of corn and 32 bushels per acre of soybeans. The minimum pre-selling price is set at $2.25 for corn and $5.13 for soybeans. The total bushels of corn pre-sold is 116,085 for $261,191 and the total bushels of soybeans pre-sold is 36,185 for a total of $185,626. The FSA payment on corn is then $35,201. The unsold bushels of corn at loan or minimum price would result in income of $112,864 and the unsold bushels of soybeans at loan or minimum price would result in income of $101,967. This aspect of the marketing plan provides income safety. Thus for example, a creditor could be assured that debt obligations could be met.

The marketing plan includes the marketing strategy of setting a cash contract basis early for corn as a marketing strategy. A marketing mission statement is prepared. Targets are set in the marketing plan at the following prices for corn: 20 percent at $2.58, 20 percent at $2.64, 20 percent at $2.72, and 20 percent at $2.76. Targets are set in the marketing plan for soybeans: 10 percent at $5.57, 10 percent at $5.81, and 10 percent at $5.93.

A marketing service provides to the customer daily electronic messages describing daily markets and making suggestions as to when to pre-sell. Based on this information, the producer is able to sell 20 percent of corn at $2.58 on March 10, then 20 percent at $2.64 on March 17, then 20 percent at $2.70 on May 3, and then 20 percent at 20 percent on May 12. The average selling price realized is $2.64. Similarly, the producer was able to sell 10 percent of soybeans at $5.75 on April 3, 10 percent of soybeans at $5.81 on May 1, and 10 percent of soybeans at $5.93 on May 3. The average selling price realized for soybeans is $5.83.

In addition to the pre-sold cash sales, price add-on strategies are implemented. On May 3, a suggestion from the marketing service to buy a $2.60 puts and sell $3.20 call spreads for corn. This price add-on strategy profited $0.61 per bushel for the producer.

In June, added $2.40 calls on corn to protect upside price movements on the pre-sold bushels. This add-on strategy did not increase profit.

At harvest time the loan deficiency payment (LDP) gan on corn was realized. The unsold gran is sealed because the harvest price is less than the sealing (loan) value. In addition, the insurance indemnity is taken because of crop insurance strategies. The 142 bushel average at a 75 percent crop insurance coverage rate at a price of $2.86 results in $305. This number is divided by the assured price of $2.11 to result in 144 bushels. The difference between the 144 bushels and 138 bushels actually harvested is 6 bushels per acre for indemnity purposes. Thus the producer receives a 6 bushel per acre indemnity payment at $2.11 per bushel. In addition, the farmer received a federal government payment of $15.27 per acre.

In this instance, the producer has 1090 acres of corn with an APH of 142 bushels per acre and a harvest average of 138 bushels per acre. A summary of the marketing events and prices is presented below.

| Event | Bus | Amount | Per ac. |
|---|---|---|---|
| Locked in $0.28/bushel cash basis | — | — | — |
| Pre-sold 80 percent of APH or 114 Bus/Acre (Avg. CBOT futures price $2.64 | 114 | $2.36 | $269.04 |
| LDP on pre-sold is $0.25 | 114 | 0.25 | 28.50 |
| LDP on unsold also $0.25 | 24 | 0.25 | 6.00 |
| Put/call underwriting | 142 | 0.61 | 86.62 |

-continued

| Event | Bus | Amount | Per ac. |
|---|---|---|---|
| strategy | | | |
| Call strategy on pre-sold net cost | 114 | 0.12 | (13.68) |
| Unsold grain inventory value (sealing price) | 24 | 1.78 | 42.72 |
| Insurance indemnity | 6 | 2.11 | 12.66 |
| Federal government payment | | | 15.27 |
| TOTALS | 138 | $3.24 | $447.13 |

The price add-on strategies are also applied to the producer's soybeans. The producer has 1122 acres of soybeans with an APH of 43 bushels per acre. In this particular season, there is a yield of only 38 bushels per acre at harvest, which is of course, unknown to the producer at the time the marketing plan is implemented. The producer locks in a $0.44 cent cash basis. The producer then pre-sells 30 percent of APH or 13 bushels per acre at $5.39. The LDP on pre-sold bushels is $0.98. On May 1, the producer, establishes $5.75 puts and sells $7.00 calls. This permits the producer to profit $0.97 per bushel. At harvest time, the producer realizes a cash price out of field (with LDP gain) of $5.28. The producer also realizes a crop insurance indemnity of 43 bushels at 75 percent coverage level at $6.07 or $196. The $196 divided by the price of $4.72 results in 42 bushels. The difference between the 42 bushels and the 38 bushels harvested is 4 bushels per acre for which an indemnity payment of $4.72 is received.

A summary of the marketing events and prices is presented below.

| Event | Bus | Amount | Per ac. |
|---|---|---|---|
| Locked in $0.44/bushel cash basis | — | — | — |
| Pre-sold 30 percent of APH or 13 Bus/Acre (Avg. CBOT futures price $5.83) | 13 | $5.39 | $70.07 |
| LDP on pre-sold is $0.98 | 12 | 0.98 | 12.74 |
| Put/call underwriting strategy | 43 | 0.97 | 41.71 |
| Cash price out of field with LDF | 25 | 5.28 | 132.00 |
| Insurance indemnity | 4 | 4.72 | 18.88 |
| Federal government payment | | | 15.27 |
| TOTALS | 38 | 7.65 | $290.67 |

Based on these prices and the 1090 acres of harvested corn and 1122 acres of harvested soybeans, the total income received is $812,503.44. This number exceeds the income objective embodied in the marketing plan of $752,000. If there would have been no pre-selling or crop insurance or marketing strategies and all of the crop was sold at harvest at harvest prices, the income would have been substantially less, the harvest prices being approximately $1.49 per bushel of corn and $4.09 per bushel of soybeans. In this instance had harvest prices been used, the agricultural operator would only have had income of $519,821 from harvest sales.

The information elicited from the producer and the calculated information may be present in the strategic marketing plan. The strategic marketing plan may include a marketing mission statement. The marketing mission statement may contain language to the effect that the producer realizes the importance of marketing and is committed to marketing. The strategic marketing plan may also include a goals and/or an objectives section that includes a particular sales goal, finance goal, profit per acre over cash flow breakeven goal for each crop, and other goals or objectives. The marketing plan may also include a market analysis with current supply and demand, projected carry over, projected number of acres to be planted the following year, projected supply the next year.

The strategic marketing plan may also include a section summarizing the break even points and the price risk for each crop. The strategic marketing plan may also include a financial status and risk of business section containing the financial risk rating, the minimum cash flow requirements, the cash reserves needed if crop insurance is not taken, the lender support for marketing and related information. The strategic marketing plan may also include a section listing the strengths of the production operation and a section listing potential opportunities associated with the production operation.

The strategic marketing plan may also include a buyer profile section that identifies the most typical buyers of crops and the typical basis associated with those buyers. The strategic marketing plan may also include a section that identifies risks, including internal business risks, product liability, external risks (i.e. economic/price risks, weather, financial risk).

The strategic marketing plan also includes the marketing tools to be used and marketing experience of the producer. The strategic marketing plan may also include other information desirable to a particular agricultural producer or to a particular lender. The present invention contemplates numerous variations in the particular content of the marketing plan.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense. The invention is to be limited only by the claims appended hereto.

What is claimed is:

1. A computer-assisted method of providing agricultural marketing services to independent agricultural producers to assist in raising income of the agricultural producers, comprising:
   developing written agricultural marketing action plans for the agricultural producers, the agricultural marketing action plans requiring updated marketing information;
   tying financial obligations of the agricultural producers to the use of the written agricultural marketing action plans such that the agricultural producers are required to commit to using the written agricultural marketing plans as a condition for receiving financing;
   electronically providing marketing information to the agricultural producers in order to update the written agricultural marketing action plans;
   wherein the updated marketing information comprises probabilities of price targets;
   wherein the step of developing written agricultural marketing action plans for each of the agricultural producers comprises
   (a) eliciting information from the producer;
   (b) performing a financial assessment for an agricultural business of the independent producer;
   (c) determining a financial assessment score based on the financial assessment;
   (d) calculating a marketing financial risk score wherein the marketing financial risk score is defined as a numeric value describing financial risks related to markets and income of each agricultural enterprise associated with the agricultural business;

(e) determining pre-sell quantities using the financial assessment score, the marketing financial risk score and a price risk associated with a commodity market;

(f) calculating a level of crop revenue insurance to assure a predetermined level of income from sale of predetermined pre-sell quantities of crops for use in meeting the financial obligations, such that the financing is underwritten by pre-selling and the pre-selling is underwritten by the level of crop revenue insurance;

(g) forming a plan of action for agricultural marketing which makes decisions based on the marketing information, the financial assessment, the marketing financial risk score, the pre-sell quantities, and the level of crop revenue insurance.

2. A computer-assisted method of creating a strategic agricultural marketing plan for an agricultural business of an independent agricultural producer comprising:

eliciting information from a producer;

performing a financial assessment of the business of the independent agricultural producer;

determining a financial assessment score based on the financial assessment;

calculating a marketing financial risk score wherein the marketing financial risk score is defined as a numeric value describing financial assessment factors associated with financial risks related to markets and income of each enterprise of the agricultural businesses;

receiving a price risk from a marketing service, wherein the price risk is a price risk of a commodity market and is determined based on a computer analysis;

determining pre-sell quantities using the financial assessment score, the marketing financial risk score and the price risk of the commodity market;

calculating, on a computer, a level of crop revenue insurance to assure at least a predetermined level of income from sale of predetermined pre-sell quantities of crops, thereby underwriting the predetermined level of income by pre-selling and underwriting the pre-selling by the level of crop revenue insurance.

3. A method of providing assured income for agricultural crops comprising:

underwriting financing of an independent agricultural producer of the agricultural crops by developing a strategic marketing action plan for the independent producer which provides the assured income based on a minimum level of crop yield and a predetermined minimum crop price achieved by pre-selling, the developing of the strategic marketing action plan including determination of a financial assessment score associated with the producer and a marketing financial risk score defining financial risks related to markets and income of the producer to assist in determining the assured income for the producer;

underwriting the strategic marketing action plan with crop insurance to assure the minimum level of crop to be sold;

updating the strategic marketing action plan on a computer with electronically supplied updated marketing information; and implementing the updated strategic marketing action plan to capture additional income beyond the assured income.

4. The method of claim 3 wherein the financing is provided to a producer conditioned on use of the strategic marketing action plan.

5. The method of claim 2 wherein the step of calculating a marketing financial risk score includes computing a numeric weighted average.

6. The method of claim 2 wherein the weighted average includes a weighted Z-factor.

7. The method of claim 5 wherein the weighted average includes a weighted marginal income rate.

8. The method of claim 2 wherein the step of computing a marketing financial risk is computing a weighted average of line of credit per acre, line of credit per assured income, current ratio, ratio of working capital to total crop expense, operating expense ratio, asset turnover ratio, interest expense ratio, operating profit ratio, return on assets ratio, line of credit to net worth ratio, leverage ratio, Z factor analysis, repayment margin and marginal income rate.

9. The method of claim 2 wherein the step of calculating the level of crop revenue insurance comprises eliciting crop production information concerning the agricultural enterprise; eliciting debt obligations of the agricultural enterprise; and selecting a crop revenue insurance level greater than the debt obligations to provide a best level of crop revenue insurance and thereby underwriting financing to the producer by the marketing plan and underwriting the marketing plan by the best level of crop revenue insurance.

10. The method of claim 2 wherein the step of calculating the level of crop insurance includes a computer program comprising:

a loan amount input;

a total number of acres input;

an interest rate on a loan input;

an average future price to pre-sell crops input;

a probability of reaching the average future price to pre-sell crops input;

an expected cash basis input;

an expected fall future price input;

a probability of reaching the expected fall future price of crops input;

an expected fall cash basis input;

a cost of a call option on pre-sold crop input;

a cost of a call on unsold crop input;

a cost of a put option on pre-sold crop input;

a cost of a put option on unsold crop input;

a LDP value on pre-sold crop input;

a minimum price for an unsold harvest input;

a set of coverage level costs for insurance coverage inputs;

a yield based on actual production history input;

an expected spring price input;

an expected harvest price input;

an anticipated pre-sell amount of crops input;

an anticipated harvest yield input;

a county loan price input;

a displayable output for the crop revenue insurance level that provides the best crop insurance coverage level most likely to produce the most revenue; and a calculation component capable of receiving the inputs and performing mathematical operations on the inputs to produce the output.

11. The method of claim 10 wherein the computer program further comprises a type of crop input.

12. The method of claim 10 wherein the computer program further comprises an estimated freedom to farm payment input, the calculation component receiving the estimated freedom to farm payment input.

13. The method of claim 10 wherein the computer program further comprises a set of underwriting on commodity future trading allowability inputs, the calculation component receiving the set of underwriting on commodity future trading allowability inputs.

14. A computer-assisted method of creating a strategic independent agricultural marketing plan for an agricultural business, comprising:
- determining a financial assessment score for the agricultural business;
- determining a marketing financial risk score for each agricultural enterprise of the business, the marketing financial risk score associated with financial risks related to markets and income of each of the agricultural enterprises;
- receiving a price risk from a marketing service, wherein the price risk is a price risk associated with a commodity market and is determined using a computer analysis;
- determining, on a computer, a level of assured income for each of the agricultural enterprises based on the financial assessment score, the marketing financial risk score, and the price risk;
- determining pre-sell quantities of crops for pre-selling for each of the agricultural enterprises;
- calculating a level of crop revenue insurance for each of the agricultural enterprises to protect revenue generated from pre-selling, thereby underwriting the pre-selling with the crop revenue insurance and underwriting the assured income with the pre-selling.

\* \* \* \* \*